United States Patent [19]
Binse et al.

[11] Patent Number: 5,492,755
[45] Date of Patent: Feb. 20, 1996

[54] PRODUCT FORMED BY A NYLON PULTRUSION PROCESS

[75] Inventors: Patrick Binse, Miribel les Echelles, France; Christian Campener, Wavre; Philip Keating, Overijse, both of Belgium

[73] Assignee: Monsanto Company, St. Louis, Mo.

[21] Appl. No.: 291,491

[22] Filed: Aug. 17, 1994

Related U.S. Application Data

[63] Continuation of Ser. No. 981,653, Nov. 25, 1992, Pat. No. 5,374,385.

[30] Foreign Application Priority Data

Nov. 28, 1991 [EP] European Pat. Off. ............ 91870190

[51] Int. Cl.⁶ .......................... B29C 67/14; B29B 15/12
[52] U.S. Cl. ...................... 428/294; 428/375; 428/396; 428/408; 428/435; 428/902; 156/166; 156/180; 156/441; 264/136; 264/257; 264/172.11
[58] Field of Search ...................... 264/136, 137, 264/174, 257, DIG. 56; 156/166, 180, 181, 433, 441; 428/375, 396, 435, 902, 408, 294

[56] References Cited

U.S. PATENT DOCUMENTS

| | | | |
|---|---|---|---|
| 3,849,154 | 11/1974 | Michael et al. | 428/396 |
| 4,635,432 | 1/1987 | Wheeler | 57/221 |
| 4,649,177 | 3/1987 | Gabbert et al. | 525/408 |
| 4,883,552 | 11/1989 | O'Connor et al. | 156/180 |
| 4,927,583 | 5/1990 | Lottiau et al. | 264/136 |
| 4,975,232 | 12/1990 | Hattori et al. | 264/137 |
| 5,002,712 | 3/1991 | Goldmann et al. | 264/136 |
| 5,004,574 | 4/1991 | Sandt | 264/257 |
| 5,084,222 | 1/1992 | Glemet et al. | 264/257 |
| 5,096,645 | 3/1992 | Fink | 264/137 |
| 5,114,633 | 5/1992 | Stewart | 156/180 |
| 5,122,417 | 6/1992 | Murakani et al. | 428/902 |
| 5,176,775 | 1/1993 | Montsinger | 156/180 |
| 5,176,865 | 1/1993 | Beall et al. | 156/180 |
| 5,207,850 | 5/1993 | Darekh | 156/166 |
| 5,294,461 | 3/1994 | Ishida | 264/136 |
| 5,310,600 | 5/1994 | Tsuya et al. | 428/435 |
| 5,424,388 | 6/1995 | Chen et al. | 264/257 |

FOREIGN PATENT DOCUMENTS

| | | | |
|---|---|---|---|
| 0281447 | 2/1988 | European Pat. Off. | |
| 0261020 | 3/1988 | European Pat. Off. | 264/136 |
| 0269197 | 6/1988 | European Pat. Off. | |
| 0373666 | 6/1990 | European Pat. Off. | |
| 0384063 | 8/1990 | European Pat. Off. | |
| 2027878 | 2/1970 | France. | |
| 3244984 | 6/1984 | Germany. | |

OTHER PUBLICATIONS

Ishida et al., 43rd Annual Conference–Composite Institute, SPI Session 6–A/pp. 1–5, 1988.

Ning et al. "Rim–Pultrusion of Nylon–6 and Rubber–Toughened Nylon–6 Composites" *Polymer Engineering and Science* vol. 31, No. 9 Mid May–1991, pp. 632–637.

*Primary Examiner*—Jay H. Woo
*Assistant Examiner*—Duane S. Smith
*Attorney, Agent, or Firm*—William J. Farrington; Mark F. Wachter

[57] ABSTRACT

Disclosed herein are pultruded articles prepared from a reinforcing material and a polyamide matrix made by the process of impregnating a reinforcing material with a polyamide forming reaction mixture and then pultruding the impregnated reinforcing material through a die while polymerizing the polyamide forming reaction mixture to form a polyamide matrix, wherein the temperature of the material being pultruded is at least about at the lower end of the melting range of the polyamide.

7 Claims, 3 Drawing Sheets

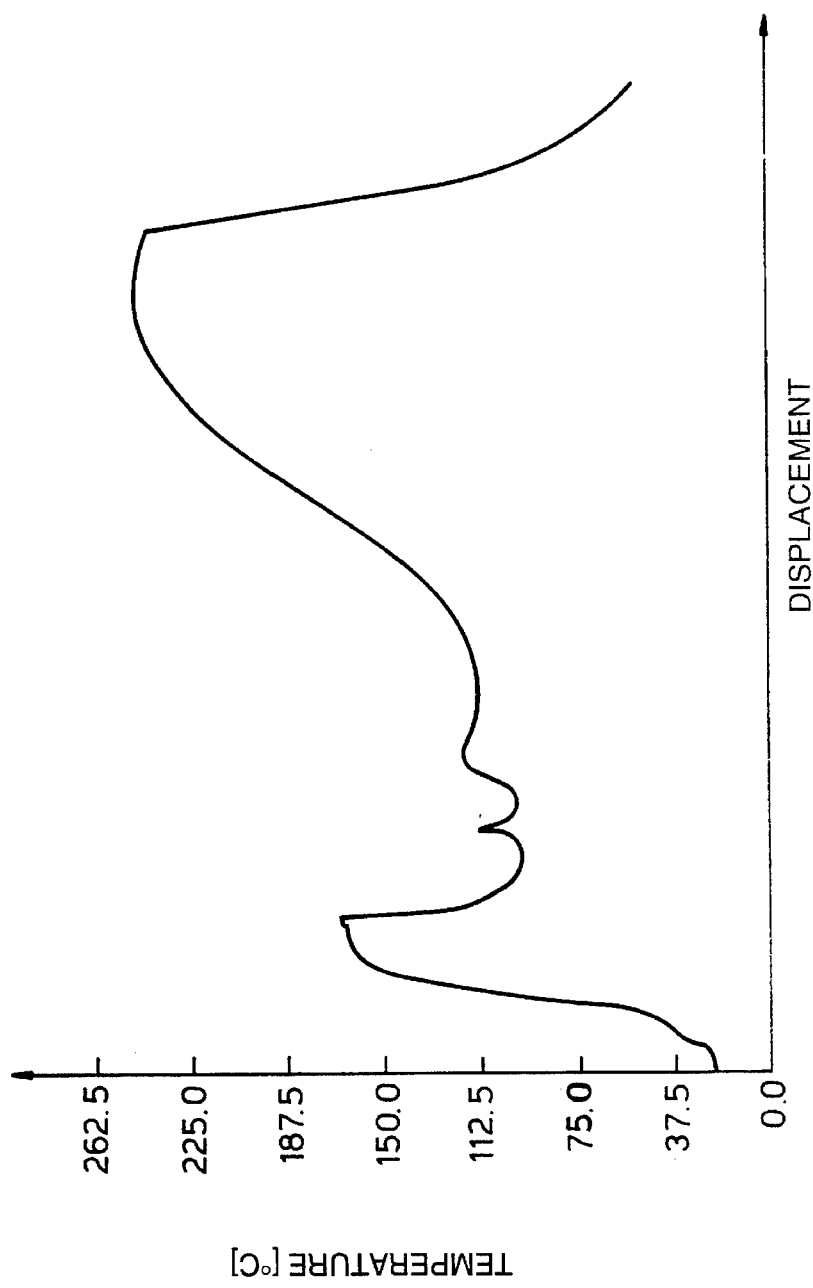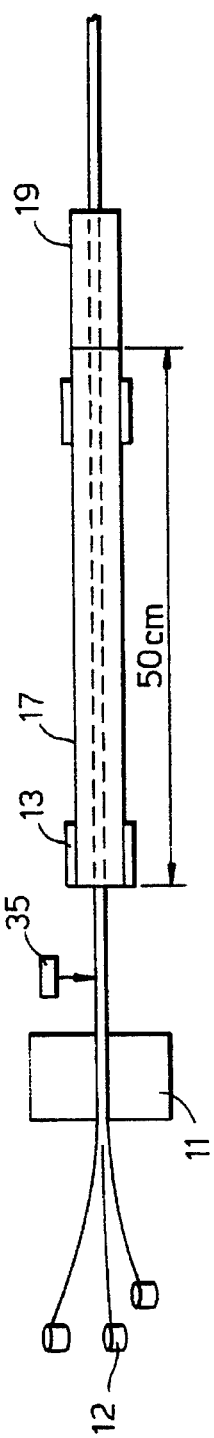

5,492,755

PRODUCT FORMED BY A NYLON PULTRUSION PROCESS

This is a continuation of application Ser. No. 07/981,653, filed Nov. 25, 1992, and now U.S. Pat. No. 5,374,385 which issued on Dec. 20, 1994.

BACKGROUND OF THE INVENTION

The invention relates to the reaction injection molding (hereinafter referred to as "RIM") pultrusion of a nylon forming material and a fibrous reinforcing material and the resulting pultruded articles.

BRIEF DESCRIPTION OF THE PRIOR ART

RIM pultrusion of nylon forming materials is taught in the following: U.S. Pat. No. 4,635,432 to C. R. Wheeler using wire as the fibrous reinforcing material; G. E. Rotter, Master Thesis entitled RIM PULTRUSION PROCESS, Case Western Reserve University, Jan. 12, 1988; a paper entitled RIM-PULTRUSION OF THERMOPLASTIC MATRIX COMPOSITES, by H. Ishida and G. Rotter distributed to attendees at the 43rd Annual Conference of SPI; European Patent Office published application 0 384 063 naming H. Ishida as the inventor; and Ishida et al., Polymer Engineering & Science, mid-May 1991, Volume 31, No. 9, pages 632 to 637.

In the prior art the pultrusion is carried out using die temperatures of about 160° C. which is well below the melting point (MP) of nylon 6 which is in the range of from 195° C. to 225° C. as reported by M. I. Kohan in Nylon Plastics, A. Wiley—Interscience Publication, John Wiley & Sons, p. 88 (1973). Kohan reports a melting point range of 210° to 225° C. for monomer extracted nylon 6 and a range of 195° to 225° C. for unextracted nylon, i.e. nylon 6 which contains residual monomer. Other nylons also have a melting range rather than a specific melting point.

SUMMARY OF THE INVENTION

The invention comprises a process for the RIM pultrusion of polyamide forming material and a fibrous reinforcing material wherein the temperature of the material being pultruded is raised above the melting point of the polyamide and pultruded articles prepared by this process. The resulting pultruded articles have better surface and physical properties than comparative samples pultruded at temperatures below the melting point of the polyamide according to the teaching of the prior art. The terms polyamide and nylon are used interchangeably in the specification.

BRIEF DESCRIPTION OF THE DRAWINGS

FIG. 5A is a typical temperature profile curve for the pultrusion operations in the pultrusion zones shown in FIG. 5B.

FIG. 5B is a typical RIM pultrusion apparatus showing the pultrusion zones.

DESCRIPTION OF THE PREFERRED EMBODIMENTS

The preferred reaction injection resin systems used in the present invention comprise a monomer, an initiator, a catalyst and optionally polymeric type components which copolymerize with the monomer. Examples of monomers suitable for use in the present invention include but are not limited to $\epsilon$-lactams and $\epsilon$-lactones with caprolactam being the preferred monomer.

Examples of initiators include but are not limited to caprolactams such as adipoylactams; isocyanates and blocked isocyanates; isophthaloyl biscaprolactam, terephthaloyl biscaprolactam; esters such as dimethylphthalate-polyethylene glycol; prepolymers of polyols or polydienes in combination with bis acid chlorides; carbonylbiscaprolactam made by reacting phosgene with caprolactam; phosphoryl initiators of the type described in U.S. Pat. Nos. 4,649,177; 4,645,800; 4,617,355 and 4,628,075 which are incorporated herein by reference.

Examples of catalysts include but are not limited to lactam magnesium halides, alkali metal adducts of caprolactam, e.g. sodium, potassium and lithium caprolactamates; aluminum or magnesium caprolactam with added magnesium bromide; alkoxides and the like.

Optional polymeric type components which copolymerize with the monomers and act as polyamide modifiers include polyoxypropylene polyol, polyoxyethylene polyol, polycaprolactone, polytetrahydrofuran, polybutadiene polyol, polyisoprene polyol, polyisobutylene polyol, poly($C_1$–$C_8$ alkylene acrylate), poly($C_1$–$C_4$ dialkylene siloxane) polyol, poly(ethylene-co-propylene)polyol, poly(ethylene-co-carbon monoxide) polyol, and the like. These components form block copolymers with the polyamide.

In general, the modifiers are amorphous and elastomeric; that is, these segments would manifest a glass transition temperature below 10° C., preferably below −10° C. Preferred modifiers are poly(propylene oxide), polytetrahydrofuran, poly(dimethyl siloxane), and polybutadiene, with poly(propylene oxide) particularly preferred.

The foregoing components are taught by Hedrick et al in U.S. Pat. Nos. 3,862,262; 4,031,164; 4,034,015; 4,546,147; 4,581,419; 4,584,344; 4,587,305; 4,590,243 and 4,590,244 which are incorporated herein by reference.

The reinforcing materials used in the present invention may be in the form of filaments, fibers, strands, woven mats, nonwoven mats and the like. The reinforcing materials may be glass, carbon, metal, phosphate, ceramic or polymeric fibers and may contain sizes or coatings to promote bonding of the resin component to the reinforcing material.

Figure 1:
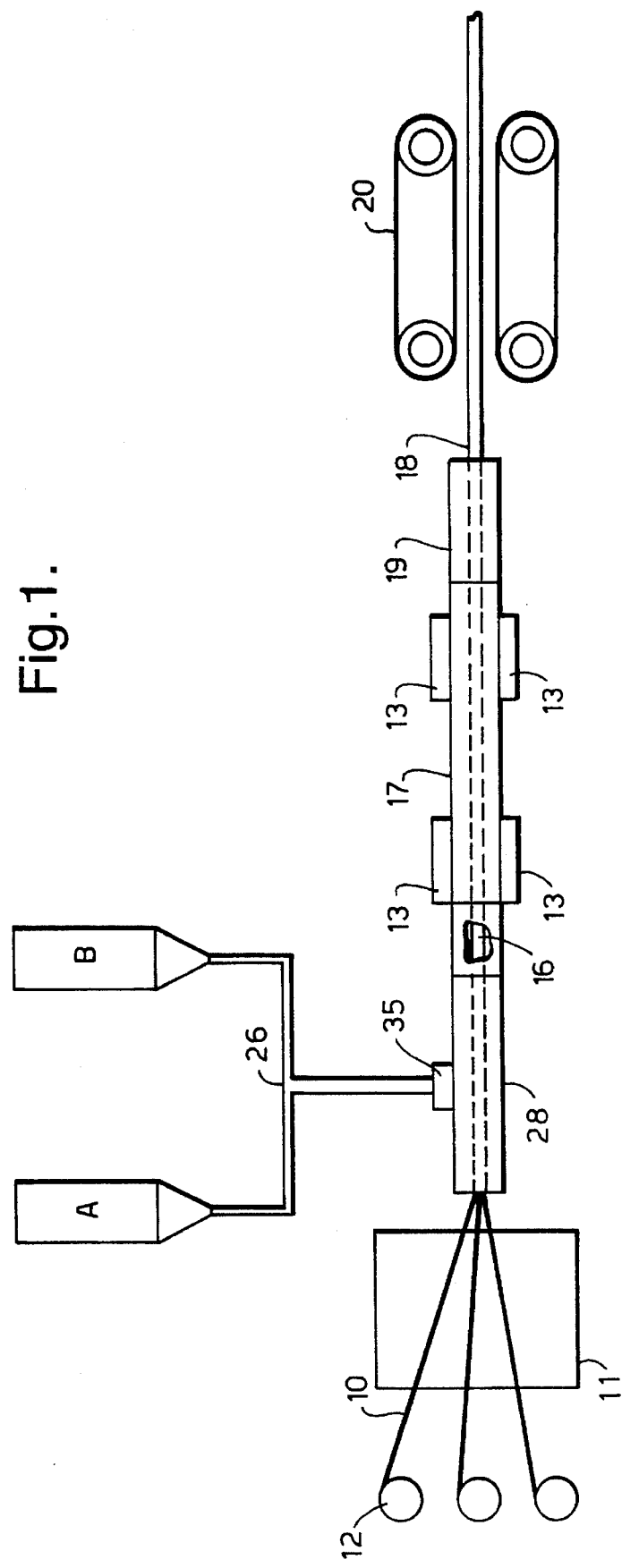
FIG. 1 shows a typical RIM pultrusion apparatus comprising feed systems for the reactive raw materials, a mixing element for combining the raw materials, feed systems for the reinforcing elements, a die and a puller.

Pultrusion apparatus for use in RIM pultrusion is well known in the art and is disclosed in U.S. Pat. No. 4,635,432 to C. R. Wheeler and EPO application 0 384 063 to H. Ishida both of which are incorporated here by reference. Referring to FIG. 1, feed tanks A and B are used to feed molten initiator/monomer and molten catalyst/monomer combinations into a mixing zone 26. The mixed components are then conveyed through an injection port 35 into a heated resin impregnation chamber 28 where the heated reinforcing material 10 which is being fed into the impregnation chamber 28 from a source 12 is impregnated with the resin forming mixture. The reinforcing material is heated by heating means 11 prior to being introduced into the impregnation chamber 28. The resin impregnated reinforcing element 16 is then conveyed through a heated die 17 which is equipped with heating elements 13. The pultruded article 18 is then conveyed through a cooling zone 19 and the cooled pultruded article is pulled from the die 17 by conventional pulling means 20. In a preferred embodiment, the impregnation chamber 28, die 17 and cooling zone 19 form a single passageway. In other embodiments the foregoing elements may be separate from one another.

Care should be taken to insure that the polymer forming reactants and the reinforcing material are dry, that is substantially free of water which would interfere with the polymerization reaction. Methods for drying these materials or for excluding water from dry materials are well known in the art and need no further discussion here.

Conditions such as line speed and dwell time in the die and die temperatures are selected to insure that the material being pultruded reaches a temperature that is above the lower end of the melting range of the polyamide formed in the pultrusion operation. This may be done in the reaction polymerization step or preferably after the polyamide material has been formed. Preferably after the polyamide forming reaction is substantially complete the newly formed polyamide is heated to a temperature which is at least 2° to 5° C. above the lower end of the MP range of the polyamide. More preferably, the temperature is at about the upper end of the melting range.

The pultruded article is then cooled below the lower end of the melting range of the nylon. Cooling can take place in the exit region of the die or outside the die between the die exit and the pullers. In a preferred embodiment the pultruded article is cooled while under confinement in a die or similar structure or while under tension from the pullers.

EXAMPLES 1 TO 10

In Examples 1 to 10 below the monomer used was caprolactam having a melting point of about 69° C.; the initiator used was isophthaloyl bis caprolactam; and the catalyst used was a magnesium bromide caprolactam adduct with a melting point of about 70° C.

The initiator was prepared by adding one (1) mole of bisacyldichloride to two (2) moles of caprolactam. The HC1 formed was neutralized with an amine and the product was recovered. The magnesium bromide adduct of caprolactam was obtained from Grant Chemical Division of Ferro Corporation of Baton Rouge, La. The concentration was 1.0 moles of magnesium bromide per kilogram of caprolactam or about 21.6 wt. % of adduct with 78.4 wt. % of caprolactam.

Referring to FIG. 1, Feed tanks A and B which have a capacity of about 25 liters and which are equipped with agitation, heating, pumping and metering means were charged as follows:

|  | wt. % |
|---|---|
| Feed Tank A | |
| initiator | 1.2 |
| monomer | 48.8 |
| Feed Tank B | |
| catalyst | 8.7 |
| monomer | 41.3 |

All of the components are solid waxy flakes at room temperature. The feed tanks and feed lines were maintained above 80° C. to keep the monomer molten. The materials in the feed tanks were agitated and the tanks were blanketed with water-free nitrogen. In Examples 1 to 10 below, the glass fibers used were 10 strands of 4800 TEX from Vetrotex.

Molten solutions of Feeds A and B were pumped to a mixing zone 26 to merge the streams and initiate the polymer forming reaction. The reaction mixture was conveyed through a static mixer (not shown) and into the impregnation chamber 28. The glass fibers 10 were heated to about 250° C. in the fiber heating zone 11 prior to being introduced into the impregnation chamber 28 where the fibers are wetted and impregnated with the resin forming reaction mixture. Then the impregnated reinforcing material was conveyed into the heated die 17 which was in communication with the impregnation chamber 28. The die used was about 50 cm long and was fitted with plate heaters 13 and thermocouples (not shown) to measure temperature. The pultruded rods were cooled under confinement in the cooling section 19 of the die. The line speed was estimated to be about one meter/minute with possible range of from 0.5 to 1 m/minute during the run. The pultruded rods, which were about six millimeters (6 mm) in diameter, were cut into 2.5 meter lengths for evaluation and testing. The glass content of the rods was about 75% by wt. The rods were examined for surface appearance, feel to the touch, flexibility by manually bending. The rods were also dropped onto a concrete floor from a height of about 20 centimeters and evaluated for solidity and integrity by the sound of the rods impacting the floor. An overall rating of poor, fair or good was then assigned to the rod. These ratings along with the color of the rod are tabulated in Table I below:

TABLE I

SUMMARY OF EXAMPLES 1 TO 10

| Example | Temp Range °C. | Rating | Color |
|---|---|---|---|
| 1 | 134 | Poor | White |
| 2 | 134 | Poor | White |
| 3 | 160 | Fair | Light buff |
| 4 | 160 | Fair | Light buff |
| 5 | 160 | Fair | Light buff |
| 6 | 180 | Fair | Light brown |
| 7 | 250 | Good | Darker brown |
| 8 | 225 | Good | Darker brown |
| 9 | 230 | Good | Darker brown |
| 10 | 230 | Good | Darker brown |

The pultruded rods were cut at 2.5 meter intervals. Thus Example 1 was the first 2.5 meter section pultruded, Example 2 was the length from 2.5 to 5 meters and so on to Example 10 at 25 meters.

A review of the Examples 1 to 10 indicates that as the pultrusion die temperature increases the rod had a better surface appearance, better feel and fewer free fibers on the surface. When dropped onto a concrete floor, the rods of Examples 7 to 10 gave a very solid ringing sound while those of Examples 1 to 4 sounded dull. In the examples shown, as die temperature increases, less force was required for pulling and there was less resin buildup in the die.

EXAMPLES 11 TO 15

The resin forming systems used in Example 1 to 10 and pultrusion procedures were used in Examples 11 to 15. The glass fiber used in Examples 11 and 12 was 9 strands 4800 TEX X9 while 19 strands of 2400 TEX were used in Examples 13 to 15. The temperature profile for the pultrusion die was as shown in Table II below.

TABLE II

SUMMARY OF EXAMPLES 11 TO 15

| Example | Length (m) | Line Speed m/min | Set Temp Range, °C. |
|---|---|---|---|
| 11 | 7.5 | 0.3 | 235/240 |
| 12 | 10.0 | 0.3 | 240/245 |
| 13 | 117.5 | 0.5 | 230/250 |
| 14 | 122.5 | 0.5 | 230/250 |
| 15 | 155.0 | 0.9 | 230/250 |

The length (m) indicates the particular 2.5 m segment of the pultruded rod which was selected for testing. The glass content of the rods was about 75% by wt. All of the rods were rated good. They had good surfaces, few free fibers and were very smooth and were solid sounding in the drop test. The color ranged from green brown to brown with increasing thermal exposures. In the pultrusion run from which Examples 11 to 15 were obtained, the set temperature was as high as 280° C. However the best rods were obtained at a set temperature of about 250° C.

EXAMPLES 16 TO 18

In another series of tests, rod samples prepared using a die temperature of about 160° C. were annealed and the ILSS measured. One sample was used as a control, while two other samples were annealed at 230° C. for fifteen minutes, and at 130° C. for 20 hours. The rod in Example 17 was annealed while being confined in a teflon sleeve while the rod of Example 18 was unconfined. Results are shown in Table III below.

TABLE III

EFFECT OF ANNEALING ON INTERLAMINAR SHEAR STRENGTH

| Example | Annealing Temp. °C. | Annealing Time (Hours) | Rating* |
|---|---|---|---|
| 16 Control | — | — | Fair |
| 17 | 230 | 0.25 | Good |
| 18 | 130 | 20 | Poor |

*on appearance and feel.

One explanation for the superior properties obtained in pultruded rods prepared by the processes of the present invention is that with the polymerization occurring at 160° C., the polymer chains are allowed to crystallize out of the reaction mixture and are instantly frozen. The polymer chains, which come out of the reaction mixture as they increase in molecular weight, become insoluble in the reaction mixture. When the newly formed nylon in the die is heated above its melting point the nylon crystallizes as a solid out of the melt and exhibits better properties. However, applicants are not to be bound by this theoretical explanation.

FIG. 5A shows a temperature profile of the pultrusion material in the apparatus shown in FIG. 5B using the processes of the present invention and polyamide forming compositions used in the working examples above. A thermocouple was used in the die to obtain the profile. The fibers are heated to about 165° C. in the heating means 11 prior to being impregnated in the impregnation chamber (not shown) with the molten polyamide forming material (resin) which is at about 80° C. The polymerization reaction continues in the die 17 (50 cm long) which is at 240° C. The material being pultruded reaches a temperature of about 240° C. prior to leaving the die 17 and passing into the cooling zone 19 where the article is cooled under confinement. Cooling under confinement improves the surface of the rod and minimizes the tendency of the rod to break upon bending.

Further work was carried out to characterize the physical properties of the pultruded rods prepared in Examples 1 to 18 above using the following tests:

TEST METHODS

ILSS is determined according to ASTM D 4475-85 on triplicate samples except for Example 14 where duplicates were tested.

DSC—differential scanning calorimetry measurements were run on a Perkin Elmer Model DSC-2 which was interfaced to an IBM PC NEC Multi Sync 2A using thermal analysis software by MC 2. DSC samples were prepared by slicing the pultruded rods into 0.25 mm slices using an electric radial saw with a diamond blade. To keep the sample from heating a steady stream of chilled nitrogen gas (–20° C.) was directed on the sample and blade. The slices were then sealed in aluminum pans for DSC analysis. The rate of heating was 20.00 degrees centigrade per minute.

Figure 2:
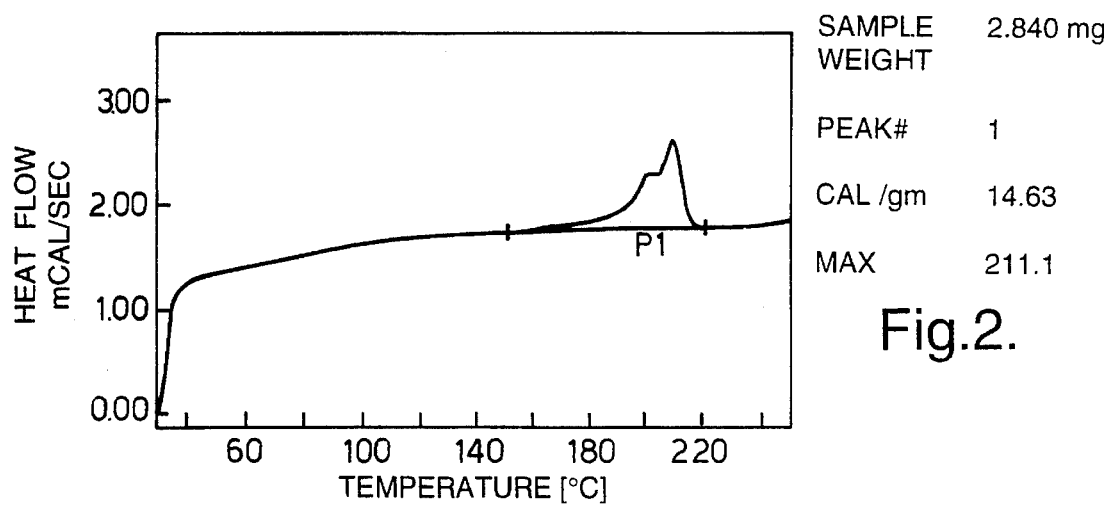
FIGS. 2 to 3 are Differential Scanning Calorimeter (DSC) curves showing the peaks obtained on samples pultruded at different temperatures.

% Crystallinity—The crystallinity of the nylon is determined from the DSC curve by calculating the area of the melting peak above a baseline drawn between tile start and end of the peak. The integrated area is then converted to units of energy per gram of sample using the heating rate and sample weight. This energy per gram is the heat of fusion for the sample. For glass-filled materials, the sample weight used is that of the matrix only, and this weight is calculated from the matrix/fiber ratio determined by independent means. The matrix heat of fusion is then divided by the heat of fusion for a pure nylon-6 crystal, and the resulting fraction multiplied by 100 gives the percent crystallinity for the matrix. R. L. Miller and L. E. Nielsen list 159 and 184 J/gm as the heat of fusion for nylon 6 [see Appendix I, page 524 to P. H. Geils "Polymer Single Crystals", Interscience (1963)]. For the pultruded composites described in Examples 5 and 10 below a mean value of 167 J/g (40 calg) was used. Referring to FIG. 2, the area under the peak is given on the graph as 14.63 cal/gm, and so the crystallinity is calculated as (14.63/40)×100=36.6% (The sample weight of 2.840 mg had already been corrected for glass content). The % crystallinity for Example 10 was calculated to be about 24%.

Figure 3:
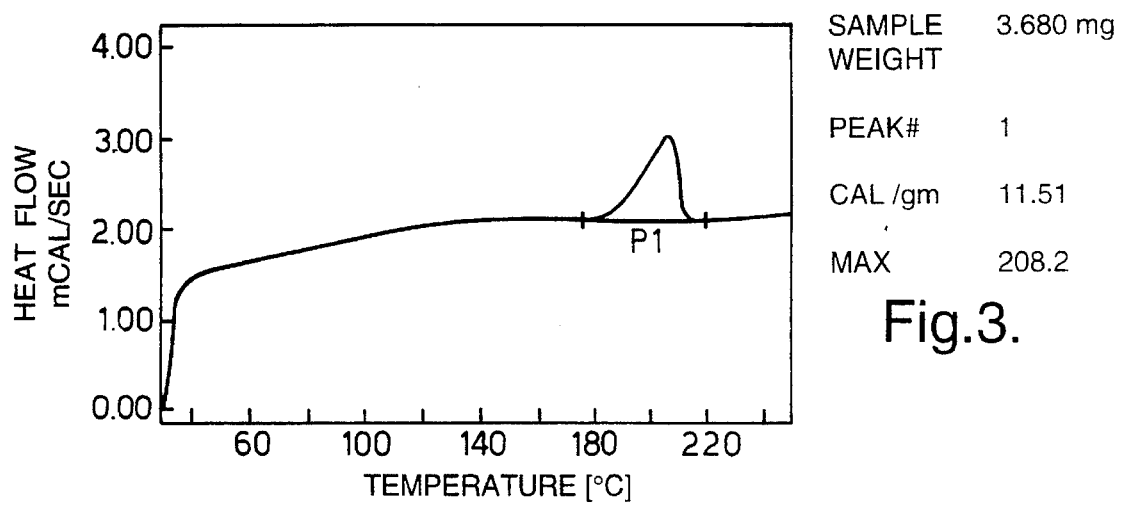
Figure 4:
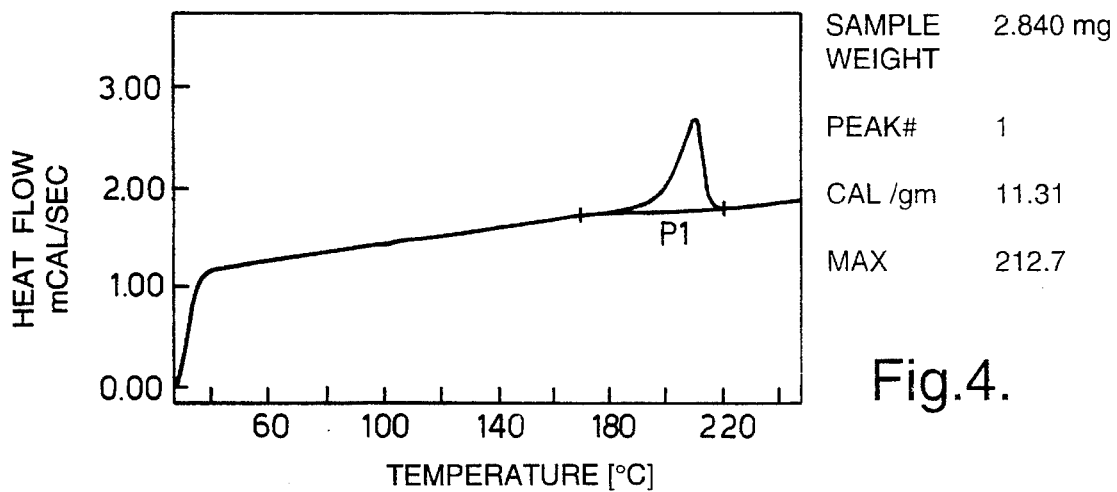
FIG. 4 is a DSC curve obtained by reheating the same material used to obtain the DSC curve in FIG. 2.

Referring to FIGS. 2, 3 and 4, FIG. 2 shows a DSC curve having two peaks for the rod prepared in Example 5 which was pultruded using a die temperature of about 160° C. FIG. 3 shows a DSC curve having a single peak for the rod prepared in Example 10 using a die temperature of about 230° C. FIG. 4 shows a DSC curve for the sample (Example 5) used to generate the curve in FIG. 2. Either during the initial heating for the DSC curve (FIG. 2) or upon reheating to generate the curve in FIG. 4, the polyamide component became less crystalline and now exhibits a single peak.

The DSC curves and % crystallinity indicate that pultruding above the lower end of the melting range gives a polyamide that has a crystalline structure different from that obtained when using the prior art processes at about 160° C.

The summary of ILSS values set forth below suggest that, in addition to a better surface appearance and feel, the processes of the present invention provides improved strength and toughness.

TABLE IV

SUMMARY OF ILSS VALUES

| Example | Die Temp. | ILSS | Standard Deviation |
|---------|-----------|------|--------------------|
| 3  | 160      | 29.3 | 1.20 |
| 4  | 160      | 31.3 | 0.44 |
| 5  | 160      | 43.2 | 3.22 |
| 9  | 230      | 48.5 | 0.20 |
| 10 | 230      | 48.2 | 0.44 |
| 11 | 235/240  | 52.2 | 0.80 |
| 12 | 240/245  | 51.3 | 0.80 |
| 13 | 230/250  | 49.2 | 1.11 |
| 14 | 230/250  | 45.2 | 0.36 |
| 15 | 230/250  | 45.0 | 1.66 |
| 16 | 160      | 47.4 | * |
| 17 | 160      | 41.6 | * |
| 18 | 160      | 37.6 | * |

*not determined

The results with Examples 3, 4, 5, 9 and 10 show an increase in ILSS with increasing die temperature. The results with Examples 11 to 15 show a decrease in ILSS with increasing line speeds. This indicates that a longer residence time in the die may be required in order to heat the material being pultruded above the lower end of the melting range of the polyamide.

We claim:

1. A pultruded article comprising a reinforcing material and a polyamide matrix which is made by a process comprising the steps of:

(a) impregnating a reinforcing material with a polyamide forming reaction mixture comprising at least one monomer, an initiator and a catalyst;

(b) pultruding the reinforcing material impregnated with the polyamide reaction mixture through a die;

(c) polymerizing the polyamide forming reaction mixture in the die to form a polyamide matrix while pultruding the impregnated reinforcing material;

(d) maintaining the temperature of the impregnated reinforcing material being pultruded at a temperature which is at least about at the lower end of the melting range of the polyamide matrix;

(e) conveying the impregnated reinforcing material to a cooling zone; and (f) recovering the pultruded article.

2. A pultruded article as in claim 1, wherein in the process used to prepare the pultruded article the temperature of the material being pultruded is at least 2° to 5° C. above the lower end of the melting point range of the polyamide.

3. A pultruded article as in claim 2, wherein in the process used to prepare the pultruded article the temperature of the material being pultruded is at least about at the upper end of the melting point range of the polyamide.

4. A pultruded article as in claim 1, wherein the polyamide matrix is based on caprolactam.

5. A pultruded article as in claim 1, wherein the polyamide matrix is based on caprolactam and a polyamide modifier.

6. A pultruded article as in claim 1 wherein in the process used to prepare the pultruded article the pultruded article is cooled before leaving the die.

7. A pultruded article as in claim 1 wherein in the process used to prepare pultruded article the pultruded article is cooled under confinement after leaving the die.

* * * * *